3,129,230
PROCESS FOR PRODUCING PHTHALIC ANHYDRIDE FROM ORTHOXYLENE

Mack F. Hughes, Albany, Calif., assignor to California Research Corporation, San Francisco, Calif., a corporation of Delaware
No Drawing. Filed Feb. 5, 1962, Ser. No. 171,251
5 Claims. (Cl. 260—346.4)

This invention relates to an improved process for the production of phthalic anhydride. More particularly, it relates to a process for the production of phthalic anhydride from orthoxylene. Still more particularly, it relates to a process for the vanadium oxide catalyzed partial oxidation of vapor phase orthoxylene at temperatures above 1100° F.

The production of phthalic anhydride by the vapor-phase oxidation of orthoxylene is well known. In the art as practiced and as described in the literature it is known that the reaction is best conducted at about 1050° F. While operation at higher reaction temperatures and, hence, faster reaction rates is highly desirable, efforts to increase production capabilities by recourse to higher temperatures have been unsuccessful because the experience has been that operation at increasingly higher reaction temperatures results in correspondingly poorer reaction selectivities, lower yields, and substantially increasing hazards of operation. As the catalyst ages, another problem encountered is a tendency for downstream migration in the catalyst bed of the "hot spot" zone, i.e., the zone of maximum bed temperature. If permitted to continue, this migration also results in poorer reaction selectivities and consequent yield losses, and can even be responsible for flash fires and serious industrial accidents.

It has now been found that phthalic anhydride may be produced by the partial oxidation of orthoxylene in the vapor-phase at temperatures above about 1100° F. by contacting a gaseous feed mixture of orthoxylene and molecular oxygen with a solid vanadium oxide catalyst in a reaction zone for a period of from about 0.001 to about 0.05 second, and thereafter cooling the resulting reaction mixture to a temperature below about 900° F. at a rate of at least $6.0 \times 10^{3°}$ F. per second and recovering phthalic anhydride from the cooled reaction mixture. Surprisingly, when the oxidation is conducted in the foregoing manner the expected decrease of reaction selectivity and yield is not experienced. Moreover, although temperatures as high as 1300°, 1400°, and even 1500° and higher may be employed, catalyst hot spot migrations are positively contained and risks due to fire and explosion from this source are eliminated.

The present process contemplates the use of a fixed bed reactor charged with a vapor-phase oxidation catalyst, preferably vanadium oxide, and particularly a supported vanadium oxide and the like. Vaporized orthoxylene and a molecular oxygen-containing gas, preferably air, are introduced separately or in admixture into a catalyst bed having a foreportion of the bed surrounded by a preheat temperature bath or an equivalent means for generating a surrounding temperature in the range of about 800–1100° F. The gaseous mixture in passing through the bed experiences in the reaction zone a marked temperature increase and which, depending upon the surrounding temperature bath, may be as much as 100° to 400° F., and even higher. After from 0.001 to 0.05 second residence time in the reaction zone, and substantially as it leaves the reaction zone, the gas stream is subjected to the action of a cooling means capable of imposing upon the oxidation product stream a cooling rate of at least about $6.0 \times 10^{3°}$ F. per second, and preferably for a period sufficient to reduce the stream temperature below abut 900° F., but greater than about 400° F. Thereafter, the product phthalic anhydride may be recovered as in conventional practice.

The cooling rate requirement and the criticality relative to location of the cooling means may be satisfied in several approximately equivalent arrangements. Desirably, the catalyst bed is maintained in a fixed position, and after start-up and location of the reaction zone a movable cooling means is positioned to impose upon the reaction product stream the necessary cooling rate as it leaves the reaction zone. A preferred method of operation is by the use of a fixed cooling element placed inside and from about 10 to 20 inches downstream in the catalyst bed. Flow rates of and temperature of the cooling fluid passing through the element define the cooling rate of the product stream as it leaves the reaction zone, and a minor adjustment in the feed composition may be used to position the reaction zone. Thus, when the catalyst bed temperature profile as well as inferior yields and reaction specificities indicate operation is unsatisfactory, a minor change in the feed and in flow rate may be made to position the reaction zone and cooling means into the essential juxtaposition critical to satisfactory operation at temperatures above about 1100° F. A still more preferred method of operation is to maintain the necessary reaction zone temperature by the use of two consecutive temperature baths. These baths must be essentially adjacent to each other. The upstream bath temperature may be in the range 900° to 1100° F. and the downstream bath temperature must be less than that of the other bath and may be in the range 400° to 800° F. Since these elements are fixed in position, the positioning of the hot spot reaction zone may be accomplished by making minor adjustments in the feed rate to the process and in bath temperatures.

By reaction zone in the present process is meant the catalyst volume in the bed in which the local temperature substantially exceeds the immediately preceding bed temperature, and the downstream catalyst bed temperature. Thus, the reaction zone is a zone of high temperature variation and, as contemplated in the present invention, is the fixed bed catalyst volume in which reaction temperatures exceed about 1100° F. Reaction times refer to the period of transit of the product generating feed stream through the reaction zone, and cooling rates refer to the temperature effect imposed upon the reaction stream immediately following the reaction zone.

Broadly, reaction zone temperatures of the order of 1100° F. to 1500° F. and even 1600° F. and higher may be used. Reaction zone temperatures in the range 1100° F. to 1500° F. are particularly desirable. Still more desirable are reaction zone temperatures in the range 1200° to 1400° F. At the lower temperatures the relatively longer reaction-zone times may be used and, correspondingly, at the lower temperatures slower cooling rates may be employed. With increase in reaction temperature, faster cooling rates and shorter times are desirable. Thus, at a reaction zone temperature in the range 1100° to 1150° F., residence times of the order of 0.05 second and cooling rates of the order of $6.0 \times 10^{3°}$ F. per second are desirable. With increase in temperature of operation, for example, in the range of about 1200° to 1300° F., shorter times may be desirably used, i.e., from about .01 to about .005 second, and faster cooling rates, i.e., from about $7.0 \times 10^{3°}$ F. per second and higher are desirably employed. In the upper operational temperature zone, for example above 1300° F., cooling rates of at least $8.0 \times 10^{3°}$ F. per second and even higher are desirable. Faster cooling rates may be employed than those indicated so long as the indicated reaction zone times are employed. Cooling rates may be as high at $2.0 \times 10^{4°}$ F. per second, or even higher, but no noteworthy advantage is obtained by operation at these higher cooling rates, and mechanical difficulties may be experienced in attempting to attain such super-cooling rates.

In general, satisfactory results are obtained when the weight ratio of air to orthoxylene employed is in the range 16:1 to 35:1, respectively, and even higher. At air to hydrocarbon ratios below about 16:1 and, particularly, at ratios below about 14:1, catalyst activity seriously declines. Thus, at a ratio of 14:1, a catalyst life of about one day is experienced, whereas at the higher air to hydrocarbon ratios, for example 17:1 and higher, catalyst lives of the order of one year are indicated. Air to hydrocarbon ratios higher than 20:1 may be used, but with the increase in air to hydrocarbon ratios, very much above this figure, the operation becomes more and more impractical because of the decreased efficiency of the process. Some variation in the optimum ratio is experienced when oxygen-enriched gases are employed or oxygen per se, but in general the weight ratios of oxygen to hydrocarbon will be of the order of those obtained when air and orthoxylene are used.

The xylene used in the process should be of fairly high purity because most hydrocarbon impurities, and particularly aliphatic hydrocarbon impurities, are oxidized under the conditions of the process and thus liberate considerable thermal energy which serves to complicate temperature control problems. While orthoxylene, having a purity of about 90%, is useful in the process, orthoxylenes having a purity of about 95% and higher are particularly desirable. A 99% orthoxylene feed is an especially desirable feed for the process.

In the operation of the process at temperatures above about 1250° F., best results are obtained when in an initial start-up using a new catalyst, the process is operated at a temperature in the range 1100° to 1200° F. for a relatively short conditioning period. The purpose of the conditioning period is to afford the catalyst an opportunity to be converted into a foam which is thermally stable. A fresh catalyst, one which is essentially in the $V_2O_5$ configuration, appears to have a tendency to fuse and ultimately gives rise to a somewhat inferior catalyst when the conditioning period is omitted. While a few hours operation at the lower temperature range is sufficient, it is desirable to condition the catalyst for as much as a day's operating time.

In the preferred operation, the reaction bed is essentially a supported vanadium oxide catalyst. However, the bed immediately following the reaction zone may be filled with the inert catalyst carrier material or even filled with other inert materials having good thermal conductivity characteristics useful in obtaining the high cooling rates which are necessary in the present process. Similarly, it is often desirable to have a short section of inert filler such as the carrier material in the forepart of the reaction bed for the purpose of supplying a feed stream preheat, and particularly in the operation of the process above about 1200° F.

To illustrate in detail the process of this invention and to guide those skilled in the art in the practice thereof, the following illustrative examples are submitted:

*Example 1*

Orthoxylene (95% pure) was charged to a vaporizer at 80.4 g. per hour (0.759 mols per hour), after which the thus generated gaseous xylene was mixed with 200° F. air fed at the rate of 0.79 cu. ft. per minute (0.926 mol per minute) measured at standard temperature and pressure. The air to hydrocarbon weight ratio in the gaseous mixture was therefore 20:1. The hot gaseous mixture was then passed downwardly through a vanadium oxide (approximately 15 parts vanadium oxide supported on 85 parts silicon carbide) catalyst bed which was 0.709 inch in diameter having a surrounding constant temperature bed maintained at 940° F. At about 20 inches from the top of the catalyst bed was located a cooling means consisting of two coaxial tubes having a length of about 16 inches. The larger tube which was sealed at one end had a diameter of about 0.25 inch and the diameter of the inner tube was about 0.125 inch. The total length of the catalyst bed was about 36 inches. The cooling means was located in a manner such that the reactor tube and the cooling element had common centers. Cooling was effected by the passage of gases or liquids up through the inner cooling tube and out through the annulus formed by the two cooling tubes. By conventional means temperatures were measured in various points throughout the reactor bed, and by the appropriate adjustment of the above-noted surrounding temperature bath and the use of the cooling element, reaction conditions were controlled in the reactor proper as desired. In this manner a reaction temperature zone at from 1100° to 1175° F. was maintained with a contact time of about 0.01 second and a cooling rate of about 7300° F. per second immediately following the hot spot temperature zone. The conversion of orthoxylene was complete and the yield obtained amount to 99 weight percent based upon orthoxylene fed.

*Example 2*

Example 1 was repeated, except that the cooling element was not operative. The inherent or normal cooling rate for this conventional operation of the unit was found to be about 5000° F. per second. The conversion of orthoxylene was complete, but the yield was only 86 weight percent based upon orthoxylene fed.

From the above examples and from the many repetitive runs which were carried out to investigate the effect of the reaction variables, it was found that while little or no advantage accrued from the use of the cooling element in the operation of the process at temperatures somewhat below 1100° F., in the operation above about 1100° F., and increasingly so as the temperature was increased, substantial improvements in yield and product selectivity were noted as a result of higher reaction temperatures and the use of the cooling element as described above. Similarly, in the use of the cooling element in conjunction with reaction zone temperature above about 1100° F., no appreciable beneficial effect was noted when cooling rates were below about 6000° F. per second. However, at cooling rates of 6000° F. and higher, substantial increases in yield and product selectivity resulted. Similarly, these data indicated that appreciable longer or shorter reaction zone residence times than described above result in inferior yields of phthalic anhydride and conversions of orthoxylene, respectively.

As will be evident to those skilled in the art, numerous modifications in this process can be made or followed, having in mind the foregoing disclosure, without departing from the spirit or scope of the disclosure or from the scope of the claims.

I claim:

1. A process for the vapor-phase partial oxidation of orthoxylene which comprises contacting vaporized orthoxylene and molecular oxygen with a solid vanadium oxide catalyst in a reaction zone at about 1100°–1500° F. for a period of from 0.001 to 0.05 second, thereafter cooling the resulting reaction mixture to a temperature in the range 400–900° F. at a rate of not less than about $6.0 \times 10^3$ ° F. per second and recovering phthalic anhydride from said cooled reaction mixture.

2. The process of claim 1, wherein said reaction zone temperature is in the range 1200°–1400° F.

3. The process of claim 1, wherein said cooling is at a rate in the range $6.0 \times 10^3$–$2.0 \times 10^4$ ° F. per second.

4. In the production of phthalic anhydride by contacting o-xylene, molecular oxygen and a solid vapor-phase oxidation catalyst in a reaction zone in a fixed-bed reactor, the improvement which comprises effecting said reaction zone contacting at a temperature in the range 1100–1500° F. for a period of from 0.001 to 0.05 seconds, and thereafter cooling the resulting reaction mixture to a temperature in the range 400–900° F. at a rate of not less than about $6.0 \times 10^3$° F. per second.

5. The process as in claim 4 wherein said reaction zone contacting temperature is in the range 1200–1400° F.

References Cited in the file of this patent
UNITED STATES PATENTS 2,438,369   Levine _____ Mar. 23, 1948